F. P. TEBBETTS.
MESSING EQUIPMENT.
APPLICATION FILED APR. 28, 1919.
1,373,156.
Patented Mar. 29, 1921.
2 SHEETS—SHEET 2.
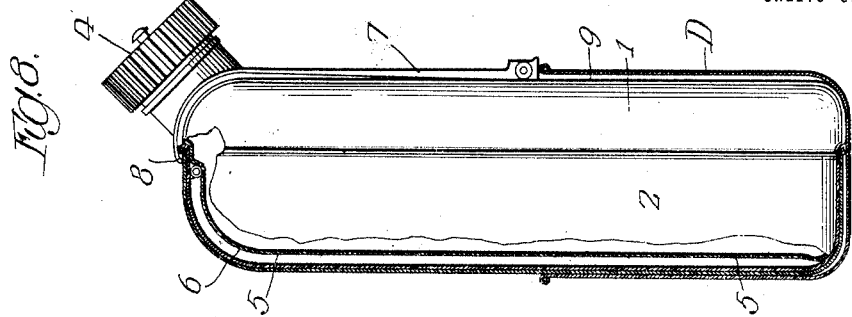
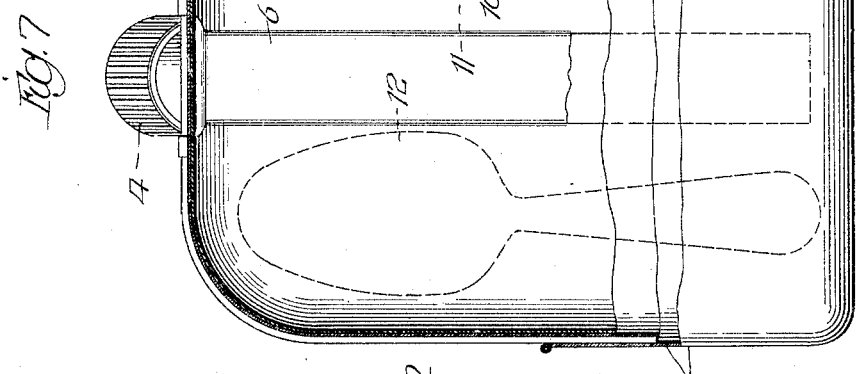
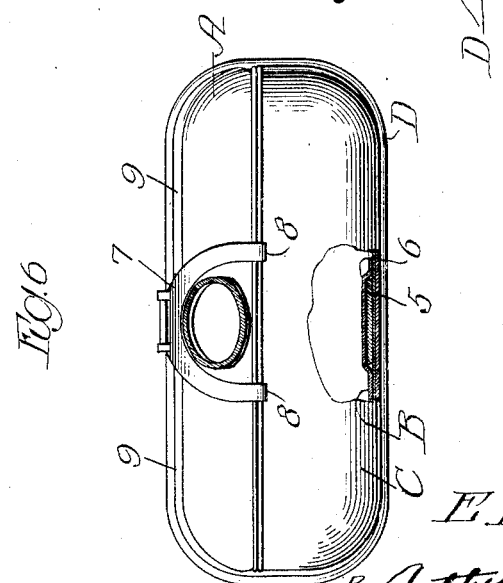
Inventor
F. P. Tebbetts
By Arthur F. Durant
Atty.

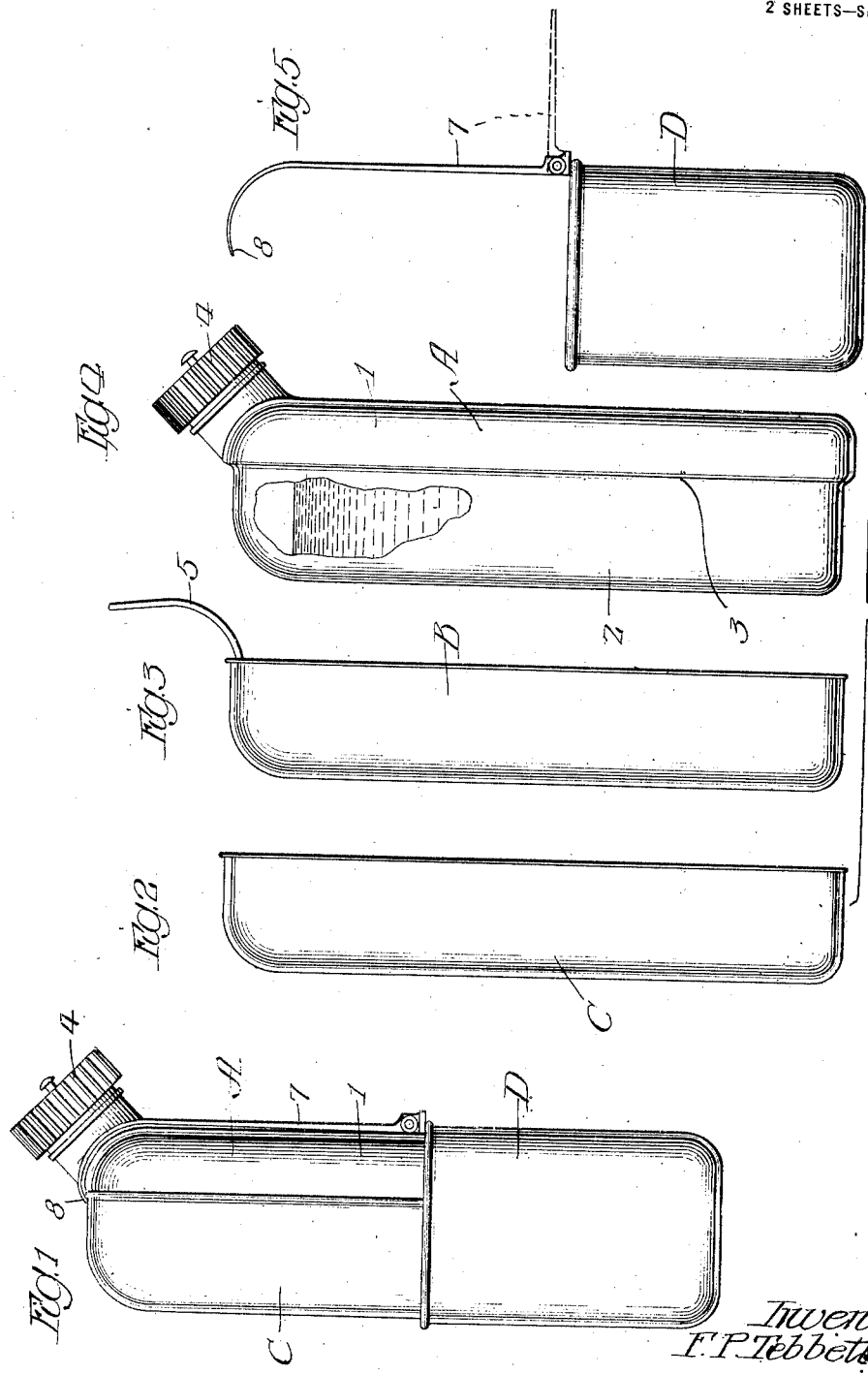

UNITED STATES PATENT OFFICE.

FRANK P. TEBBETTS, OF PORTLAND, OREGON.

MESSING EQUIPMENT.

1,373,156.      Specification of Letters Patent.      Patented Mar. 29, 1921.

Application filed April 28, 1919. Serial No. 293,272.

*To all whom it may concern:*

Be it known that I, FRANK P. TEBBETTS, a citizen of the United States of America, and a resident of Portland, Oregon, have invented a certain new and useful Improvement in Messing Equipments, of which the following is a specification.

This is an improvement on the construction of messing equipment shown and described in my prior application No. 201,710, filed January 8, 1918.

The object of the present invention is to provide a novel and improved construction and arrangement whereby the two pans may be nested together at one and the same side of the flask or water bottle; to provide an improved construction and arrangement whereby the cap or closure of the flask is arranged to overhang one side of the mess-kit, thus affording greater convenience in the use thereof; and to provide certain other details and features of construction tending to increase the general efficiency and the desirability of a mess-kit of this particular character.

To these and other useful ends the invention consists in matters hereinafter set forth and claimed, and shown in the accompanying drawings, in which—

Figure 1 is a side elevation of a mess-kit embodying the principles of the invention.

Fig. 2 is a side elevation of one of the pans.

Fig. 3 is a side elevation of the other or inner pan.

Fig. 4 is a side elevation of the flask or water bottle, with a portion thereof broken away.

Fig. 5 is a side elevation of the cup.

Fig. 6 is a top or plan view of the mess-kit, with a portion thereof broken away and other portions in section to illustrate the construction.

Fig. 7 is a front elevation of the mess-kit, with a portion thereof broken away, and with certain walls in section to illustrate the construction.

Fig. 8 is a view similar to Fig. 1, but with certain portions thereof shown in vertical section.

As thus illustrated, the invention comprises a flask or water bottle A having a relatively large section 1 and a relatively small section 2, with a shoulder 3 between them, and a neck and cap or closure 4 at the top of the section 1, this closure being inclined at an angle to overhang the rear or larger side of the flask. The pan B is shaped to receive the section 2 of the flask, and to fit tightly thereover, and is provided with a hinged handle 5 which is shaped to fold into the pan, and to rest in the groove 6 formed in the flask. The second pan C is adapted to fit over the pan B, and is preferably without a handle. A cup D is adapted to fit over the lower end of the assembled pans and flask, and is provided with a hinged handle 7 which is formed to embrace the neck of the closure 4, and has its end portions 8 adapted to snap over and engage the rim of the pan C, as shown in the drawings, thus holding the entire mess-kit together. Space 9 is left between the inside of the cup and the outer surface of the section 1 of the flask, and a knife 10 and a fork 11 and a spoon 12, as indicated in dotted lines in Fig. 7, are made with flat handles and are inserted downwardly into this space.

By displacing the closure 4 to one side of the center, and allowing it to overhang the outer or rear side of the mess-kit, clearance is left for the upper edges of the pans, and for the hinged portion of the handle 5, and the front side of the kit is left smooth and adapted to be placed next to the body of the wearer or user.

The neck and closure 4 of the flask are left free and clear and exposed, so that the cap can be removed for the purpose of discharging the contents therefrom, without disturbing the cup or the pans or any other portions of the kit. When the cup D is removed, its handle 7 can be swung into a horizontal position, as shown in dotted lines in Fig. 5; and when the pans are removed the handle 5 can be swung outwardly to provide a long handle by which to hold the pan B, in a manner that will be readily understood.

The mess-kit thus constructed can be carried in a canvas bag, or attached to a belt, as described in said prior application. In use, the mess-kit has various advantages, as explained in said prior application, and as herein shown and described has certain additional advantages, by reason of the inclined position of the neck and cap or closure 4 of the flask, and the arrangement of the two pans at one and the same side of the flask, so that both the closure and the knife and fork and spoon are on the outside of the mess-kit and away from the body of the wearer when in use, and whereby convenience and other advantages are obtained in the use of the mess-kit.

What I claim as my invention is:—

1. In a mess-kit, the combination of a flask, a pan shaped to fit the side of the flask, so that the pan is in direct contact with the upper and lower ends of the flask, and a cup adapted and intended for cooking or drinking purposes and shaped to receive the lower end portions of the nested flask and pan and constructed to be fastened in place thereon, whereby this flask and pan are held together by the cup, leaving the upper portion of the pan and one side of the flask exposed above the rim of the cup, when the latter is fastened in place, said flask being formed with a large section and a small section, the small section only being adapted to receive said pan, so that the pan cannot be applied to the other section, and having a shoulder forming the line of demarcation between the two sections to meet the edge of the pan, a neck on the upper end of the large section, and a closure for said neck.

2. In a mess-kit, the combination of a flask, a pan shaped to fit the side of the flask, so that the pan is in direct contact with the upper and lower ends of the flask, and a cup adapted and intended for cooking or drinking purposes and shaped to receive the lower end portions of the nested flask and pan and constructed to be fastened in place thereon, whereby the flask and pan are held together by the cup, leaving the upper portion of the pan and one side of the flask exposed and extending above the rim of the cup, when the latter is fastened in place, the upper end of the flask having a removable closure which remains outside of the pan, said cup having a hinged handle to engage the upper end of the kit to hold the cup in place, said pan and said handle being disposed at opposite sides of the flask, so that the exposed side of the flask has the handle overlying the surface thereof, and said handle extending over the rim of the pan to lock the kit together.

3. In a mess-kit, the combination of a flask, a pan shaped to fit the side of the flask, so that the pan is in direct contact with the upper and lower ends of the flask, and a cup adapted and intended for cooking or drinking purposes and shaped to receive the lower end portions of the nested flask and pan and constructed to be fastened in place thereon, whereby the flask and pan are held together by the cup, leaving the upper portion of the pan and one side of the flask exposed and extending above the rim of the cup, when the latter is fastened in place, the upper end of the flask having a removable closure which remains outside of the pan, said closure being a screw-cap, and said cup having a handle which is forked to engage the top of the kit at opposite sides of said screw-cap, said screw-cap being inclined to overhang said handle, at the exposed side of the flask, and the pan being disposed at the other side.

4. A structure as specified in claim 1, in combination with a larger pan telescoped over said first mentioned pan, so that one pan is clamped between the small section of the flask and the other pan.

5. A structure as specified in claim 2, in combination with a second pan telescoped over said first mentioned pan, said handle engaging the rim of the outer pan to lock the kit together.

6. A structure as specified in claim 3, said flask being reduced at one side to receive the pan, having a shoulder to meet the edge of the pan, and said screw-cap being inclined away from said pan to overhang the larger side of the flask.

7. A structure as specified in claim 1, said pan having a folding handle adapted to fold therein, and the small section of said flask having a cavity to receive said handle, when the latter is folded into the pan, and when the pan is fitted to the flask.

8. A structure as specified in claim 2, said pan having a folding handle, in combination with a handleless pan telescoped over said first mentioned pan, and one side of the flask being reduced to receive the two pans.

FRANK P. TEBBETTS.